United States Patent
Nelson et al.

(10) Patent No.: US 6,302,296 B1
(45) Date of Patent: Oct. 16, 2001

(54) METHOD AND APPARATUS FOR DEPOSITING A FOOD PRODUCT

(75) Inventors: Roy B. Nelson; David Howard Nelson, both of York (GB)

(73) Assignee: Nestec S.A., Vevey (CH)

(*) Notice: Subject to any disclaimer, the term of this patent is extended or adjusted under 35 U.S.C. 154(b) by 0 days.

(21) Appl. No.: 09/575,674

(22) Filed: Jun. 21, 2000

(30) Foreign Application Priority Data

Jun. 28, 1999 (EP) ................................................ 99202075

(51) Int. Cl.[7] .................................................. G01F 11/00
(52) U.S. Cl. ............................... 222/1; 222/63; 222/387; 222/389; 222/554
(58) Field of Search .................................. 222/1, 61, 63, 222/386, 387, 389, 554

(56) References Cited

U.S. PATENT DOCUMENTS

| | | | |
|---|---|---|---|
| 2,127,389 | * 8/1938 | Church | 222/554 |
| 4,089,438 | * 5/1978 | Steels | 425/549 |
| 4,771,726 | 9/1988 | Fitch, Jr. | 118/25 |
| 5,452,824 | * 9/1995 | Danek et al. | 222/389 |
| 5,458,275 | * 10/1995 | Centea et al. | 222/389 |
| 5,927,560 | * 7/1999 | Lewis et al. | 222/386 |

FOREIGN PATENT DOCUMENTS

| | | | |
|---|---|---|---|
| 2716078 A | 8/1995 | (FR) | A23G/3/20 |
| 2026378 A | 2/1980 | (GB) | B29B/5/04 |

* cited by examiner

*Primary Examiner*—Joseph A. Kaufman
(74) *Attorney, Agent, or Firm*—Winston & Strawn

(57) ABSTRACT

The invention relates to a method and device for depositing confectionery into a mold. The device includes a piston member for discharging in a stroke a confectionery mass into the mold; a valve for cutting off the stroke to stop the discharge; and a nozzle having an outlet portion of reduced diameter. The piston member can have an operative stroke profile comprising a velocity that increases during the stroke. Additionally, the valve may move relative to the nozzle during cut-off and can have a starting cut-off motion magnitude of at least 400 mm/sec. The invention eliminates the tailing problems and can improve the accuracy and repeatability of weights during deposition.

18 Claims, 1 Drawing Sheet

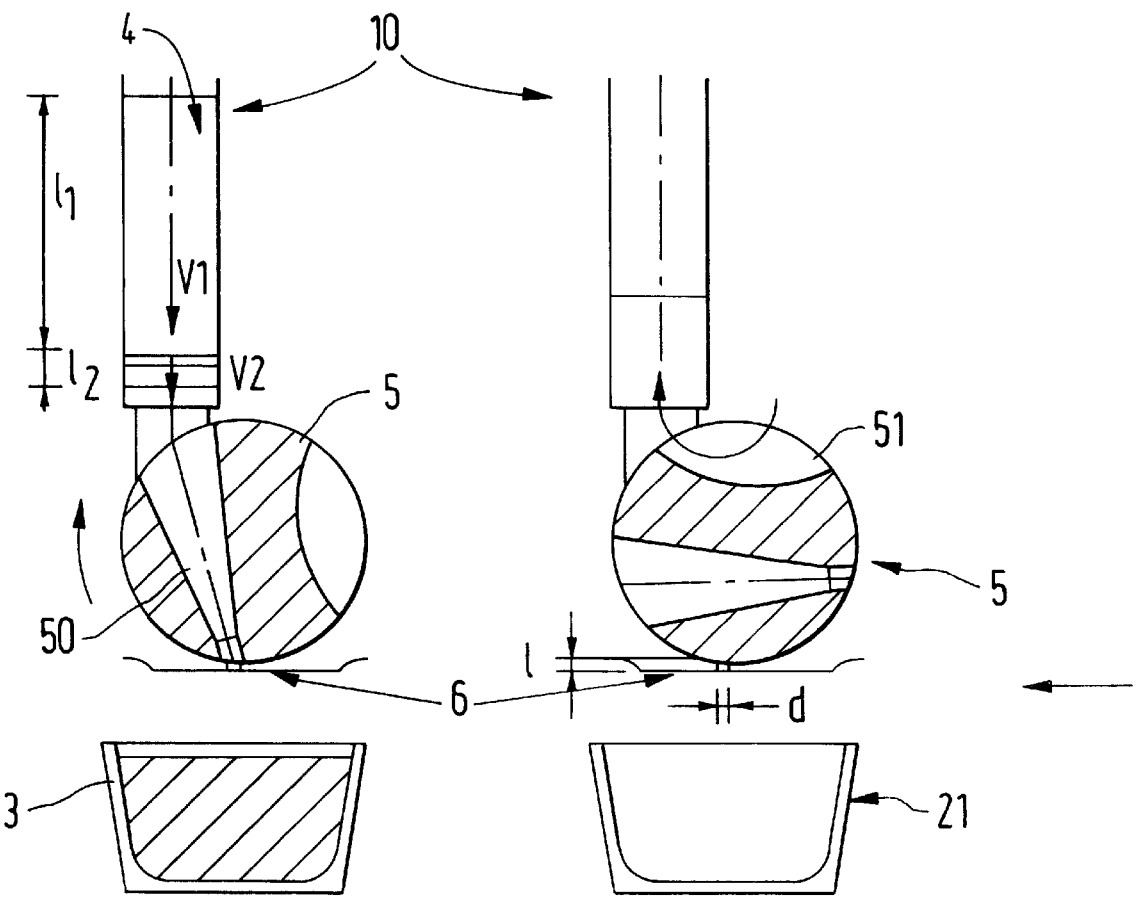

METHOD AND APPARATUS FOR DEPOSITING A FOOD PRODUCT

CROSS-REFERENCE TO RELATED APPLICATIONS

Not Applicable

STATEMENT REGARDING FEDERALLY SPONSORED RESEARCH

Not Applicable

REFERENCE TO A MICROFICHE APPENDIX

Not Applicable

FIELD OF THE INVENTION

The present invention relates to the depositing of food products, in particular to the depositing of confectionery products such as chocolate, caramels, toffees, fudges, high boiled sweets, etc.

BACKGROUND OF THE INVENTION

The manufacturing of shaped food products, in particular confectionery products, generally comprises a step of depositing into a mold, in order to set the desired shape to the product. The method includes a step of injecting a metered amount of food mass with a piston through a nozzle into a mold. Then, cooling or drying of the deposited mass is carried out until setting the final product is properly achieved.

Various patent documents illustrate the depositing technology for confectionery. For instance, U.S. Pat. Nos. 4,004, 716 and 4,089,438 both relate to a depositor of confectionery material into molds. Other prior art documents can be cited as references related to a similar technical field, such as U.S. Pat. No. 2,837,041, British patent application 2,026, 378, and French patent application 1,132,821.

However, the above-discussed depositing process, as traditionally applied, particularly for confectionery of high viscosity, suffers from serious drawbacks that have until now remained unresolved. One of the main disadvantages relates to the difficulty in separating a deposited portion of a material from the material remaining in the depositing nozzle. The material tends to stretch out in a long tail that does not easily break under its own weight and gravity. This phenomenon is known as "tailing." A defect such as this may consequently affect the accuracy of dosing, weight, and/or shape of a final molded product. After depositing, the resulting formation of many strings formed across the molds is not hygienic and thus needs to be removed. Tailing is also aesthetically unpleasing and can cause major quality control inconsistencies. Defects such as these may lead to difficulties in wrapping the product. For instance, when caramel is deposited in a shell-molded chocolate product, the tail may cause a channel through the chocolate cover, which may stick to the packaging. Tailing may also clog the nozzle or block moving parts of the depositing device.

Past attempts to reduce tailing have consisted of physically cutting the tail. For instance, British patent application 2,026,378 proposes to discharge a pulse of steam or compressed air through the nozzle at the time of the separation of the confectionery mass. These solutions have proven to be ineffective, are complicated, or can be costly to implement.

The present invention can overcome the problems associated with the formation of a tail in a mold depositing process of a food mass, in particular, confectionery products, and may alleviate the need for additional mechanical or gas pulsing devices. As a consequence, the present invention allows formation of a regular flat surface on top of the deposit, which has proven to be beneficial for the weight control, final look, and mouthfeel of the product, as well as for ease of wrapping.

SUMMARY OF THE INVENTION

The present invention is directed to a device for depositing a confectionery product into a mold including: a piston member for discharging in a stroke a confectionery mass into the mold; a valve for cutting off the stroke to stop the discharge of the confectionery mass; and a nozzle having an outlet portion of reduced diameter. Advantageously, the piston member can have an operative stroke profile including a velocity that increases during the stroke.

The operative stroke profile can contain distinct velocity periods or can include a continuous increase of the velocity until it reaches a pre-determined boosted velocity.

In a preferred embodiment, the valve may be part of a valve means that can include a high-speed rotary, needle, or slipper valve. Advantageously, the piston member may be part of a pressure means that can be refilled by generating a pressure sufficient to provoke the suction of the confectionery mass into the pressure means until the piston member is positioned for starting its discharge stroke.

The present invention is also directed to a method for depositing a viscous or liquid-like food mass into a mold comprising: applying a pressure stroke of increasing velocity to the food mass in a pressure zone; discharging the food mass from the pressure zone through an outlet of reduced diameter; and stopping the discharge of the food mass through the outlet by a valve actuating at a cut-off motion speed of at least 400 mm/sec.

In a preferred embodiment, the food mass may be discharged through an outlet having a diameter, d, of less than about 2 mm and a length less than about 1.5 mm. In another preferred embodiment, the weight of the food mass can be from about 0.8 grams to 50 grams in each stroke. Preferably, the food mass is a confectionery mass which may advantageously have a viscosity of about 1 to 2500 poise.

BRIEF DESCRIPTION OF THE DRAWINGS

The present invention can be described in further detail, by way of example only, with reference to the accompanying figures.

FIG. 1 is a schematic drawing of a preferred embodiment of an apparatus for carrying out the method of the present invention during the depositing cycle.

FIG. 2 is a schematic drawing of a preferred embodiment of an apparatus for carrying out the method of the present invention during the suction fill for preparing the next depositing cycle.

DETAILED DESCRIPTION OF THE PREFERRED EMBODIMENTS

The present invention relates to a device and method for depositing confectionery into a mold. The device has a pressure means that includes a piston member for discharging in a stroke a confectionery mass into the mold; means including a valve for cutting off the stroke to stop the discharge of the confectionery; and a nozzle having an outlet portion of reduced diameter. The piston member advantageously has an operative stroke profile with a velocity that increases during the stroke, and the valve moves relative to the nozzle during cut-off and has at least a starting cut-off motion magnitude of at least 400 mm/sec. Preferably, the velocity of the operative stroke profile increases in a ratio from about 2:1 to 4:1.

In one embodiment, the operative stroke profile includes at least two sequentially distinct velocity periods. A first period can have a predetermined velocity and a second period can have a velocity higher than the first period. The first period corresponds to the initial deposit run and the second period corresponds to the final boost. In another embodiment, the second period may represent less than about 15% of the stroke time, more preferably from about 5 to 10% of the stroke time, such that the mechanical shock/wear and the work done by the hydraulic drive fluids may be minimized. Preferably, the operative stroke profile includes a continuous increase of the velocity until reaching a terminal pre-determined boosted velocity.

Without being necessarily bound to this theory, it is supposed that the combination of a "boosted" discharge of the product with a high-speed cut-off through a reduced diameter nozzle can break the elastic tail that has plagued prior art devices. In a preferred aspect of the invention, an outlet portion of the nozzle may be sized in order to maintain a sufficient velocity of the product flow, a factor which can favorably reduce tailing. In particular, the outlet portion may have a diameter less than about 5 mm, preferably less than about 2 mm. The outlet portion can also have a length of less than about 1.5 mm, preferably about 1 mm, such that the likelihood of in-flight errors due to hold-up in the nozzle may be reduced.

The present invention is particularly suitable for a wide range of depositable food products. In particular, it has been found to be advantageous to use the apparatus of the present invention for confectionery or other liquid or semisolid products having a shear viscosity ranging from about 1 to 2500 poise. It must be noted that these viscosities may encompass Newtonian and/or non-Newtonian characteristics. Appropriate material yield behavior and viscosity are necessary for strong viscoelastic properties, which are particularly important for preventing or inhibiting the tailing problem. As viscosity measurements are only an indication of flowability, they may not totally reflect certain viscoelastic properties of a food material.

In a preferred aspect of the invention, the pressure means can be refilled after the depositing stage by applying a pressure sufficient to provoke the suction of the confectionery mass in the pressure means until the piston member is in its ascent position. Preferably, the pressure may be at least about 4 bars, and most preferably is about 6 bars. A pressurized fill system has proven to be important to ensure repeatability and weight control of the molded products.

The volume of the material deposited may vary depending upon the desired sizes of the molded product to be produced. Successful results have been obtained by the apparatus of the present invention for producing deposits in the range of 0.8 to 50 grams. The apparatus has specifically shown a very high efficiency for molding products of 2 to 10 grams. Repeatable accuracy of about ±0.03 grams can be obtained when the molded product possesses a flat upper surface.

It has also been found that the production cycles can reach very high-speeds, with an expected range of about 10 to 36 strokes per minute. This may be possible to achieve without affecting piston or cut-off performance.

The present invention also relates to a method for depositing a viscous food mass into a mold including: applying a pressure stroke of increasing velocity to a food mass in a pressure zone; discharging the confectionery mass from the pressure zone through an outlet of reduced diameter; and stopping the discharge of the food mass through the outlet by a valve actuating at a cut-off motion of at least 400 mm/sec.

Advantageously, pressure can be applied on the food mass during the stroke at an initial velocity, V1, and at a terminal velocity, V2, greater than the first velocity, such that the ratio between V2 and V1 may be from about 2:1 to 4:1. Alternately, the initial velocity can be constantly maintained during a first period and the terminal velocity may be constantly maintained during a second period shorter than the first period.

In a preferred embodiment, the velocity may be gradually increased between the initial velocity and the terminal velocity. Also, the food mass is advantageously a confectionery product. Preferably, the food mass may possess a shear viscosity ranging from about 1 to 2500 poise.

Further embodiments of the method according to the present invention may include, but are not limited to, the use of any combination of preferred embodiments of the device according to the present invention, as detailed above.

The apparatus of the present invention is generally identified by reference numeral 10 in the figures. The complete depositing system comprises a series of molds, generally attached to conveyor means (not pictorially represented). The conveyor means can be intermittently moved to place an empty mold 3 into position underneath the depositing apparatus 10 after termination of each depositing cycle. After depositing, the food product may be moved away by the conveyor means and may be allowed to at least partly solidify, for example, under a cooling tunnel or other similar cooling means (not pictorially represented). Then, the molded food product can be removed from the mold by inverting the mold. If needed, ejection means may be used to facilitate the removal of the food product.

The apparatus of the present invention comprises pressure means 4, generally a piston/chamber assembly, connected to a hopper for storage of a large quantity of food material in a viscous or liquid-like state. A rotary valve 5, comprising a passage 50 for the fluid, can be connected to the pressure means to link the outlet of the chamber to a nozzle 6. During the deposition cycle, the rotary valve 5 may be in an open configuration, as portrayed in FIG. 1. The piston can be moved downwardly into the chamber to push the viscous product contained therein toward the nozzle 6. According to one of the aspects of the present invention, the piston may be driven in accordance with an operative stroke profile which includes a first stroke length $l_1$ during which the piston has a velocity V1 and a second stroke length $l_2$ during which the piston has a second velocity V2. The velocity V2 can advantageously be greater than the velocity V1. Preferably, the velocity V2 has at least twice the magnitude of the velocity V1. However, the velocity V2 may stroke profile can be controlled by an electronic controlling device comprising an encoder coupled to the piston means which can provide feedback information to a computer.

Just before the end of the deposit stroke of the piston, the rotary valve may be rotated to close the passage 50 at a very high speed. A suitable speed can be at least about 400 mm/sec., preferably about 500 to 1000 mm/sec. For a rotary valve, the speed may be measured as the circumferential distance traveled by the valve per unit time. The timing can be controlled by an electronic controlling device permitting an accurate cut-off of the valve on the order of several milliseconds. The electronic device may also comprise an encoder attached to the valve, which feeds back to a computer. The control of the cut-off of the valve can be precisely linked to the stroke profile of the piston to prevent or inhibit tail formation, depending on certain specific characteristics of the products to be deposited. It may be possible to start the valve cut-off at the given high-speed conditions, then to reduce speed slightly toward the end of the movement to the suction position, embodied in FIG. 2. At this stage, depositing of filling material can be fully discontinued. It must be noted that the valve speed may be varied independently of the viscosity of the product.

One of the other important aspects of the invention is the specific size of the outlet portion of the nozzle 6, which, combined with the piston motion and the high-speed cut-off of the valve, can facilitate the reduction of a tail and can increase the accuracy of the volumetric feed. The diameter, d, of the nozzle may vary depending upon the viscosity of the food material to be deposited to maintain a sufficiently high cut-off velocity. Preferably, the diameter, d, of the nozzle may be less than about 5 mm, more preferably on the order of about 1.5 mm. The nozzle also has a length, L, which can be sufficiently low as to reduce the hold-up in the nozzle after the cut-off of the valve, as shown in FIG. 2. The length, L, of the nozzle may represent the distance measured between the outlet of the nozzle 6 and the outlet of the valve 5, when the passage of the valve is coaxial with the nozzle.

As shown in FIG. 2, the pressure means 10, comprising the chamber, can be refilled after the depositing cycle has been completed. According to another important feature of the invention, the pressure means may be fed at a pressure sufficient to provoke the suction of liquid product into the chamber. Pressure feeding can be important for ensuring an accurate volumetric filling of the pressure means. In that case, the rotary valve can further comprise a peripheral depression 51, which may advantageously be linked with a source of pressurized product, preferably pressurized by gas or pump (not pictorially represented). In the position illustrated in FIG. 2, where the piston is lowered and the valve cut off, the depression 51 can serve to connect the chamber outlet of the pressure means 4 to a feed reservoir (accumulator) at a pressure of at least about 4 bars, preferably at least about 6 bars, which may cause a highly accurate, pressurized volumetric fill during the ascent of the piston to the position shown in FIG. 1. It has so been found that the extreme accuracy and repeatability of weights during the deposition may be very dependent upon the pressurized filling operation, during which an accurate volumetric feed can be completed. The apparatus is then ready for another deposition cycle.

It must be noted that the depositing apparatus may serve to deposit a filling of confectionery mass in a mold already partly filled with other types of confectionery material. A typical application of this type would be the production of shell-molded chocolate products with viscous fillings, for example, such as caramel. An appropriate method can be to fill melted chocolate with a normal depositing device, to invert the mold, and to remove the excess chocolate by shaking, in order to provide a U-shaped cup of chocolate. Then, a filling of caramel may be deposited using the method and apparatus of the invention. Finally, a layer of chocolate can be sprayed on the upper surface of the filling to form the bottom of the confectionery upon removal from the mold cavity.

EXAMPLES

Certain of the preferred embodiments of the present invention will be illustrated by reference to the following example, which is included to exemplify, but not to limit, the scope of the present invention or the appended claims thereto.

Confectionery Deposition Process Set Points

As an example, typical standard sweets of 3 grams have been successfully deposited by the method and apparatus of the invention. The operative stroke profile was set up at approximately 0.0064 grams/millisecond for the initial stroke period corresponding to stroke portion $l_1$ of about 17 mm and approximately 0.023 grams/millisecond for the terminal boost period corresponding to stroke portion $l_2$ of about 3 mm. The initial period took place over 400 milliseconds and the final boost period over 20 milliseconds.

Although the present invention is described with reference to certain preferred embodiments, it is apparent that various modifications may be made, and variations thereof may be fashioned, by those of ordinary skill in the art without departing from the scope of this invention as defined by the appended claims. For example, the valve means can also be a needle valve or a slipper valve.

Deposit of Computer Program Listings

Not Applicable

What is claimed is:

1. A device for depositing a confectionery product into a mold comprising:
   a piston member for discharging in a stroke a confectionery mass into the mold;
   a valve for cutting off the stroke to stop the discharge of the confectionery mass; and
   a nozzle having an outlet portion of reduced diameter;
   wherein said piston member has an operative stroke profile comprising a velocity that increases during the stroke, and wherein said valve moves relative to the nozzle during cut-off and has a starting cut-off motion speed of at least 400 mm/sec.

2. The device of claim 1, wherein the velocity of the operative stroke profile increases in a ratio from about 2:1 to 4:1.

3. The device of claim 1, wherein the operative stroke profile comprises at least two sequentially distinct velocity periods, a first period having a predetermined velocity and a second period having a velocity higher than the first period.

4. The device of claim 3, wherein the second period represents less than 15% of the stroke.

5. The device of claim 4, wherein the second period represents from about 5 to 10% of the stroke.

6. The device of claim 1, wherein the operative stroke profile comprises a continuous increase of the velocity until reaching a pre-determined boosted velocity.

7. The device of claim 1, wherein the outlet portion has a diameter less than 5 mm.

8. The device of claim 1, wherein the cut-off motion speed of the valve is from about 500 to 1000 mm/second.

9. The device of claim 1, wherein the valve is part of a valve means that includes a high-speed rotary, needle or slipper valve.

10. The device of claim 1, wherein the piston member is part of a pressure means that is refilled by generating a pressure sufficient to provoke the suction of the confectionery mass into the pressure means until the piston member is positioned for starting its discharge stroke.

11. A method for depositing a viscous or liquid-like food mass into a mold comprising:
   applying a pressure stroke of increasing velocity to the food mass in a pressure zone;

discharging the food mass from the pressure zone through an outlet of reduced diameter; and stopping the discharge of the food mass through the outlet by a valve actuating at a cut-off motion speed of at least 400 mm/sec.

12. The method of claim 11, wherein pressure is applied on the food mass during the pressure stroke at an initial velocity, V1, and at a terminal velocity, V2, which is greater than the first velocity, such that the ratio between V2 and V1 is from about 2:1 to 4:1.

13. The method of claim 12, wherein the initial velocity is constantly maintained during a first period and the terminal velocity is constantly maintained during a second period which is shorter than the first period.

14. The method of claim 13, wherein the shorter second period represents about 5 to 10% of the stroke.

15. The method of claim 12, wherein the velocity is gradually increased between the initial velocity and the terminal velocity.

16. The method of claim 11, wherein the food mass is discharged through an outlet having a diameter d of less than about 2 mm and a length less than about 1.5 mm.

17. The method of claim 11, wherein the weight of the food mass is from about 0.8 to 50 grams in each stroke.

18. The method of claim 11, wherein the food mass is a confectionery mass having a viscosity of about 1 to 2500 poise.

* * * * *